(12) United States Patent
Giselbrecht et al.

(10) Patent No.: US 12,582,927 B2
(45) Date of Patent: Mar. 24, 2026

(54) APPARATUS AND METHOD FOR DEGASSING A DEVICE, AND CORRESPONDING TEST SYSTEM FOR GAS ANALYSIS

(71) Applicant: Omicron electronics GmbH, Klaus (AT)

(72) Inventors: Dietmar Giselbrecht, Bregenz (AT); Martin Anglhuber, Feldkirch (AT)

(73) Assignee: Omicron electronics GmbH, Klaus (AT)

( * ) Notice: Subject to any disclaimer, the term of this patent is extended or adjusted under 35 U.S.C. 154(b) by 343 days.

(21) Appl. No.: 18/249,240

(22) PCT Filed: Oct. 6, 2021

(86) PCT No.: PCT/EP2021/077564
§ 371 (c)(1),
(2) Date: Apr. 14, 2023

(87) PCT Pub. No.: WO2022/084041
PCT Pub. Date: Apr. 28, 2022

(65) Prior Publication Data
US 2023/0390669 A1 Dec. 7, 2023

(30) Foreign Application Priority Data

Oct. 19, 2020 (AT) .............................. A 50895/2020
Nov. 23, 2020 (AT) .............................. A 51015/2020

(51) Int. Cl.
B01D 19/00 (2006.01)
(52) U.S. Cl.
CPC ................................ B01D 19/0063 (2013.01)

(58) Field of Classification Search
CPC ................ B01D 19/0063; B01D 19/00; G01N 2001/2229; G01N 33/2841; H01J 9/385
(Continued)

(56) References Cited

U.S. PATENT DOCUMENTS 4,407,665 A 10/1983 Lasater
4,456,172 A 6/1984 Roffelsen
(Continued)

FOREIGN PATENT DOCUMENTS

CN 101444648 A 6/2009
CN 203133096 U 8/2013
(Continued)

OTHER PUBLICATIONS

International Search Report with English translation, counterpart International Appl. No. PCT/EP2021/077564 (Jan. 11, 2022) (8 pages).
(Continued)

*Primary Examiner* — T. Bennett Mckenzie
(74) *Attorney, Agent, or Firm* — Cook Alex Ltd.

(57) ABSTRACT

In order to degas a device (7), an apparatus (10) is provided that comprises a control unit (19), a pump (3), a first volume (1,2), a second volume (6), valve means (12), a first valve (15) and a second valve (14). At the discharge end, the pump (3) is connected to an air outlet (21) via the valve means (12) and to the first volume (1, 2) via the valve means (12). The first volume (1, 2) and the second volume (6) are connected via the first valve (15). At the intake end, the pump (3) is connected to the first volume (1, 2) via the second valve (14) and can be connected to the device (7) to be degassed.

17 Claims, 2 Drawing Sheets

(58) Field of Classification Search
USPC ........................................................... 96/155
See application file for complete search history.

(56) References Cited

U.S. PATENT DOCUMENTS

| | | | |
|---|---|---|---|
| 4,763,514 A | 8/1988 | Naito et al. | |
| 2004/0159096 A1 | 8/2004 | Yasui et al. | |
| 2009/0320841 A1 | 12/2009 | Haveri | |
| 2011/0138768 A1* | 6/2011 | Draper ...................... | F02C 3/34 |
| | | | 60/39.52 |
| 2011/0259466 A1 | 10/2011 | Tastard et al. | |
| 2012/0100630 A1 | 4/2012 | Wimberger-Friedl et al. | |
| 2013/0156646 A1 | 6/2013 | Bernhard | |
| 2015/0020530 A1* | 1/2015 | Pandey ..................... | F02C 3/30 |
| | | | 60/39.5 |
| 2016/0376992 A1* | 12/2016 | Davis, Jr. .................. | F02C 3/04 |
| | | | 60/39.5 |
| 2020/0360586 A1 | 11/2020 | Peters et al. | |
| 2023/0390668 A1 | 12/2023 | Giselbrecht et al. | |

FOREIGN PATENT DOCUMENTS

| | | | | | |
|---|---|---|---|---|---|
| CN | 205229169 U | 5/2016 | | | |
| CN | 105921066 A | 9/2016 | | | |
| CN | 208984599 U | 6/2019 | | | |
| CN | 210674325 | 6/2020 | | | |
| DE | 2358068 | 6/1974 | | | |
| DE | 20217473 | 3/2003 | | | |
| DE | 10252652 | 5/2004 | | | |
| DE | 102017126136 | 5/2019 | | | |
| DE | 102017126136 A1 * | 5/2019 | ........ | B01D 19/0063 |
| DE | 102018119715 | 1/2020 | | | |
| GB | 1417028 | 12/1975 | | | |
| JP | H109128 A | 1/1998 | | | |
| WO | WO 95/28626 | 10/1995 | | | |
| WO | WO2012/045404 | 4/2012 | | | |
| WO | WO 2017/125214 | 7/2017 | | | |

OTHER PUBLICATIONS

Shuying Li, *Degassing Rate Determination Method and Its Application*, Hebei Electric Power Technology, Issue 06, 30-34 (Dec. 25, 1987).

Xu et al., *Design of a Gas Separation System Based on Thermal Transpiration Effect*, Contemporary Chemical Industry, vol. 47, No. 01, 95-97, 112 (Jan. 28, 2018).

Zhang et al., *A Small Vacuum Online Degassing Technology in Oil Dissolved Gas Chromatography*, Automation of Electric Power Systems, vol. 31, No. 11, 92-96 (Jun. 10, 2007).

* cited by examiner

APPARATUS AND METHOD FOR DEGASSING A DEVICE, AND CORRESPONDING TEST SYSTEM FOR GAS ANALYSIS

The present application is a U.S. National Stage of PCT International Patent Application No. PCT/EP2021/077564, filed Oct. 6, 2021, which claims priority to Austrian Application Nos. A50895/2020, filed Oct. 19, 2020, and A51015/2020, filed Nov. 23, 2020, all of which are hereby incorporated herein by reference.

FIELD OF THE INVENTION

The present invention relates to an apparatus and a method for degassing a device, wherein a dead volume fraction is reduced, for example in order to be able to better analyze dissolved gases.

BACKGROUND OF THE INVENTION

The analysis of gases dissolved in an insulating oil (Dissolved Gas Analysis (DGA)) is an important approach, for example for state determination and error recognition of oil-paper-insulated power transformers. Prior to the analysis, the gases to be analyzed must be freed from the insulating oil, for example, which is known as degassing. Such degassing can take place via various methods. The highest extraction rate is achieved with a full degassing by means of a vacuum.

The extraction of the gas from the insulating oil, for example, is all the more effective the lower the pressure in the vessel or volume which receives the gas is. Degassing pumps, with which such an extraction of the gas is performed, also function all the more efficiently the lower the differential pressure between the pressure at the entry to the pump and the pressure at the discharge of the pump is. Therefore, the volume at the discharge end of the pump according to the prior art is selected such that the pressure in this volume does not rise too greatly during degassing or extraction.

For this purpose, parts of a degassing unit can be evacuated by means of a pump, which is also used for the degassing. However, there is a problem here that ambient pressure prevails at the outlet of the pump and in the pipes which lead away from it, so that this air located in the so-called dead volume contaminates the degassing unit after the degassing unit switches from evacuation to degassing. For example, a dead volume of, for example, 100 µl at an overall volume of 10 ml already causes a contamination of almost 7000 ppm of nitrogen, which makes it difficult to perform measurements of nitrogen in the low ppm range.

SUMMARY OF THE INVENTION

Therefore, the present invention sets itself the task of reducing contamination by the gas located in the dead volume (air, in particular) compared to the prior art. In doing so, the means of solving this problem should be as inexpensive as possible and require as little space as possible.

According to the invention, this task is accomplished by an apparatus for degassing a device, by a test system and by a method for degassing a device as may be recited in the independent claims. The dependent claims define preferred and/or advantageous embodiments of the present invention.

Within the framework of the present invention, there is provided an apparatus for degassing a device (in particular a degassing vessel). This apparatus comprises a control unit, a pump, a first volume or vessel, a second volume or vessel, valve means, a first valve and a second valve. The valve means can comprise a 3-way valve or two valves.

The pump is connected, via the valve means, to an air outlet, via which, for example, the apparatus and the device which is to be degassed are evacuated. On the other hand, the pump is connected to the first volume at a discharge end via the valve means, in order to thus pump gas, for example, out of the device to be degassed into the first volume. The first volume and the second volume are connected to one another by means of the first valve, such that, depending on the state (opened or closed) of the first valve, the first volume is connected to the second volume or the two volumes are separated. At an intake end, the pump is connected to the first volume via a second valve, such that the pump (e.g, during the evacuation) can pump gas out of the second volume when the second valve (and the first valve) is (are) opened. At the intake end, the pump can be connected to the device to be degassed, such that the pump can pump gas away from or out of the device when the pump is connected to the device.

The apparatus advantageously makes it possible for the pump to be used, alongside the gas extraction or degassing, for both evacuation of the device (e.g. a degassing vessel) and for evacuation of the first volume and the second volume. During evacuation, the second volume is accordingly also evacuated to a very low pressure (e.g. 0.1 mbar). If, after the evacuating, the first volume, and thus also the second volume that is connected to the first volume, is connected at the discharge of the pump, the air located in the dead volume is distributed to the overall volume, which is formed by the dead volume, the first volume and the second volume. Through the large second volume, the amount of contaminating air thus present in the first volume is significantly lower than would be the case without the second volume. Broadly speaking, a second volume that has a volume content which is greater than the first volume by the factor X, reduces the contamination due to the air in the dead volume in the first volume by the factor X compared to a conventional apparatus without the second volume. For the degassing which follows the evacuation, the second volume is cut off from the first volume by means of the first valve.

Due to contamination by the air in the dead volume being able to be greatly reduced, according to the invention, compared to the prior art, it is advantageously also extremely simply possible to examine an insulating oil for oxygen and nitrogen (substances which are also present in the dead volume) with good analysis results, since the examined gas is not dominated by the substances in the dead volume.

The volume content of the second volume is preferably at least ten times, and better at least 100 times, and even better at least 1000 times larger than the volume content of the first volume.

The larger the second volume is in relation to the first volume, then, advantageously, the smaller is the contamination in the first volume due to the air in the dead volume.

The second volume, which can also be called a gas tank, can be realised by a convenient pneumatic cylinder. Furthermore, the second volume or gas tank can be arranged at any desired location in the apparatus. Any longer pipes to the second volume only increase its volume and as a result advantageously increase the effect of a reduction of the contamination by the air in the dead volume.

Furthermore, it is advantageous to design the apparatus such that the dead volume is kept as small as possible, for example by the distance between the discharge of the pump and the valve means being as small as possible.

According to an inventive embodiment, the apparatus, with the aid of its control unit, switches the valve means such that the valve means connect the discharge of the pump only to the air outlet. In addition, with the aid of its control unit, the apparatus opens the first valve and the second valve. After the valve means connect the discharge of the pump only to the air outlet, the control unit activates the pump to pump gas out of the device connected to the apparatus and out of the first volume and the second volume in order to evacuate the device, the first volume and the second volume.

Due to the valve means connecting the discharge of the pump only to the air outlet (and not yet to the first volume) and the first and second valves being opened, the pump can advantageously effectively evacuate both the device, which is connected to the apparatus, and also the first and the second volumes in one process (i.e., for example without toggling the valves).

According to an inventive embodiment, the apparatus, with the aid of its control unit, switches the valve means such that the valve means directly connect the discharge of the pump only to the first volume. Furthermore, with the aid of its control unit, the apparatus opens the first valve and the second valve, such that a pressure equalisation then takes place in an overall volume, which comprises the first volume, the second volume and the dead volume.

Due to the first volume and the second volume being connected to one another via the first valve during the pressure equalisation, the air present in the dead volume is advantageously distributed not only in the first volume, but rather also in the larger second volume. As a result, the contamination is advantageously significantly lower in the first volume than if the second volume were not present, as is the case according to the prior art.

According to an inventive embodiment, the apparatus, with the aid of its control unit, switches the valve means such that the valve means directly connect the discharge of the pump only to the first volume. In addition, the apparatus closes the first valve and the second valve by means of its control unit. After the first valve and the second valve are closed, the control unit activates the pump, in order to pump gas from the device into the first volume.

Due to the valve means connecting the pump only to the first volume at the discharge end, and the first and the second valve being closed, the apparatus can advantageously also be employed to degas gas from the device (e.g. a degassing vessel) into the first volume by means of the pump. Accordingly, the same pump is advantageously employed both for the evacuation and for the degassing.

According to an inventive embodiment, the apparatus comprises a third valve. The device to be degassed is connected to the intake of the pump via this third valve.

The third valve makes it possible for the apparatus to be connected permanently (via the third valve) to the device which is to be degassed. With this third valve it is very simple to control the evacuating step, the pressure equalisation and also the degassing step. In the evacuating step and degassing step, the third valve is opened, such that the pump can pump gas away from the device to be degassed. In contrast, the third valve is closed during the pressure equalisation and during a potential compressing step (see below), as is described more precisely hereafter.

According to an inventive embodiment, the apparatus, by means of its control unit, switches the valve means such that the valve means connect the discharge of the pump only to the air outlet. In addition, the first, second and third valves are opened by means of the control unit. After the first, second and third valves are opened, the control unit activates the pump, as a result of which the pump pumps gas out of the device, the first volume and the second volume, such that the device, the first volume and the second volume are evacuated.

Since the discharge of the pump is connected only to the air outlet and the first to third valves are opened, the pump is advantageously capable of evacuating the device to be degassed, and also the first and the second volume, in one step.

According to an inventive embodiment, the apparatus, with the aid of its control unit, switches the valve means such that the pump is directly connected, by its discharge, only to the first volume. In addition, by means of the control unit, the first valve and the second valve are opened and the third valve is closed. As soon as the first valve and the second valve are opened and the third valve is closed, a pressure equalisation is performed in an overall volume, which comprises the first volume, the second volume and the dead volume.

Since the first volume, the second volume and the dead volume form an overall volume during the pressure equalisation, the air present in the dead volume is advantageously distributed in this overall volume. As a result, the contamination which takes place through the air in the dead volume is advantageously significantly lower in the first volume, than if the second volume were not present, as is the case with a conventional apparatus.

According to an inventive embodiment, the apparatus, by means of its control unit, switches the valve means such that the valve means directly connect the discharge of the pump only to the first volume. Furthermore, by means of the control unit, the first and the second valve are closed and the third valve is opened. After the first and the second valve are closed and the third valve is opened, the control unit activates the pump so that the pump pumps gas from the device into the first volume.

Since the valve means connect the pump only to the first volume at the discharge end and the first and the second valve are closed, the gas is degassed or pumped out of the device which is to be degassed via the opened third valve only into the first volume.

Accordingly, the same pump can advantageously be employed both for the evacuation of the device and of the apparatus, and also for the degassing.

According to an inventive embodiment, the apparatus also comprises a sensor. The sensor is arranged at least partially inside the first volume and is designed to analyze a gas in the first volume.

With the aid of the sensor, the analysis of the gas in the first volume can take place in a virtually automated manner after the degassing. This sensor measures the gases. The sensor can be a semiconductor sensor, an optical sensor (or an optical measuring apparatus), a thermal conductivity sensor or a chemical analysis apparatus (e.g. a gas chromatograph), for example. In other words, the sensor is, in particular, any apparatus which can measure gases and—in this case—requires these gases in as high an (absolute) concentration as possible.

According to an inventive embodiment, the first volume comprises a first partial volume and a second partial volume. The first partial volume is connected to the second partial volume via an additional valve of the apparatus. By means of the control unit, the valve means are switched such that they directly connect the discharge of the pump only to the first volume or first partial volume. Furthermore, the control means close the first, the third and the additional valve, while they open the second valve. After the first, the third and the additional valve are closed and the second valve is opened, the pump is activated by the control unit, in order to subsequently pump gas from the second partial volume into the first partial volume. As a result, the gas degassed from the device to be degassed is advantageously compressed in the first partial volume, as a result of which the analysis of this gas is made easier.

In this embodiment, the additional valve is advantageously opened during the degassing step, such that the gas is pumped, from the device to be degassed, both into the first and into the second partial volume. In the following compressing step, the additional valve is closed, such that there is only still one opened connection via the pump between the first partial volume and the second partial volume. As a result, in the compressing step, the pump can pump gas out of the second partial volume (low-pressure volume) into the first partial volume (high-pressure volume), in order to increase the pressure there. Through the higher pressure, the concentration of the gases in the first partial volume is increased, which is favourable for a subsequent analysis of these gases.

The apparatus according to the invention advantageously makes it possible that, during the degassing, the extracted gas is pumped or conveyed into both partial volumes, such that the pressure at the discharge side of the pump only slightly rises. After the degassing, the same pump can pump the extracted gas out of the second partial volume into the first partial volume, as a result of which the pressure of the extracted gas in the first partial volume increases.

The second partial volume or low-pressure volume is preferably at least five times, and better ten times, and even better 20 times larger than the first partial volume or high-pressure volume. However, it is also possible that (depending on the amount of gas present and on the pump) the second partial volume or low-pressure volume is 100 times or even 1000 times larger than the first partial volume or high-pressure volume.

According to this embodiment, the high-pressure volume is significantly smaller than the low-pressure volume. The volume of the low-pressure volume is advantageously chosen such that the pressure at the discharge end of the pump does not rise during the degassing in such a way that the efficiency of the pump is impaired.

In an exemplary application, only very little gas (approx. 1 ml) can be available. In this case, the first partial volume (high-pressure volume) can be 0.5 ml in size and the second partial volume (low-pressure volume) can be 10 ml in size.

The absolute sizes of the partial volumes generally depend on how much gas is meant to, or can, be measured (i.e. is available). The absolute sizes for the partial volumes also depend on an employed sensor (for analysing the gas). It is certainly possible that the volumes are in the μl range (i.e. are significantly smaller than 1 ml). On the other hand, it is also possible for several liters of gas to arise (e.g. during emission measurements), with the partial volumes then being chosen to be correspondingly larger (in the range of 1 L to 20 L).

The ratios between the gas volume (volume of the gases to be analyzed, or degassing volumes) and the first and second partial volumes are substantially similar. The second partial volume (low-pressure volume) is mostly chosen to be equal to or larger than the gas volume, while the first partial volume (high-pressure volume) is significantly smaller. The ratios can depend on the pump employed. For example, when employing a high-pressure pump, the second partial volume (low-pressure volume) may only be, for example, one tenth of the gas volume. In this case, the second partial volume would therefore be smaller than the gas volume.

Within the framework of the present invention, a test system is also provided for testing dissolved gases and gas at or in an installation, such as a high-voltage installation, for example. The test system comprises an evaluation unit and an apparatus, according to the invention, for degassing, as described previously. The test system is designed in order to perform an analysis of the gas in or from the installation (e.g. an analysis of the gas dissolved in the insulating oil of a high-voltage installation). The evaluation unit is designed in order to analyze the gas pumped into the first volume, for example with the aid of the sensor of the apparatus, and in order to draw up and advantageously output a result of the testing of the installation, depending on this analysis.

The test system according to the invention can, in a similar manner to the apparatus according to the invention, be employed on oil-insulated high-voltage installations, such as power transformers, current transformers, voltage transformers and gas-insulated switchgears. The gas to be analyzed can be a gas which is employed to insulate the high-voltage installation itself, or a gas which has been released from a liquid of an insulation or an insulating oil.

Finally, within the framework of the present invention, there is provided a method for degassing a device. This method comprises the following steps:

connecting a first volume to a second volume which can be cut off from the first volume. This step can be performed for example by opening a valve between the first volume and the second volume.

Evacuating the device together with the first and second volumes. In this step, the device to be degassed and the first and second volumes in particular are connected to one another via opened valves, such that the same pump can evacuate the device, which is to be degassed, in one step together with the first and second volumes, without having to make any changes to the settings (e.g. changing the setting of certain valves or valve means).

Cutting the device to be degassed off from the first volume and the second volume. This step can for example be performed in an automated manner, by closing a valve, with which the device to be degassed is connected to the apparatus.

Performing a pressure equalisation in an overall volume, which comprises the first volume, the second volume and the dead volume. In this step, there advantageously exists no connection between the first volume or the second volume and the outside world. This can be accomplished for example by the previously described valve means being switched such that neither the discharge of the pump nor the first volume are connected to the air outlet via the valve means.

Separating the second volume from the first volume. For this purpose, the valve which connects the first volume to the second volume, is preferably closed.

Degassing the device in the first volume. In this step, the gas, in particular, is pumped into the first volume from the device to be degassed by means of the pump.

An important step of the previously described method is the step of performing the pressure equalisation. In this step, the air in the dead volume is distributed to the first and the second volume. Since the second volume is actually present and is significantly larger than the first volume, the gas in the dead volume contaminates the gas in the first volume to a significantly smaller extent than if the second volume were not present.

Furthermore, the advantages of the method according to the invention substantially correspond to the advantages of the apparatus according to the invention, which are previously described, such that we will refrain from repeating them here.

The device to be degassed is in particular a degassing vessel into which a liquid to be degassed (e.g. oil) is filled, for example manually. However, it is also possible that no manual process is required, for example by liquid to be degassed being filled (pumped) automatically into the degassing vessel or by the gas which is fed to the apparatus according to the invention or the test system according to the invention and which is to be analyzed being taken directly from an installation (e.g. a high-voltage installation). In the latter case, the device to be degassed virtually corresponds to the installation. Therefore, the apparatus can be designed for degassing an insulating fluid (e.g. oil) of a high-voltage installation.

In addition to the examination of high-voltage installations, the present invention can also generally be employed for gas measuring devices. Thus the present invention can be employed for quality control in the laboratory, for process analysis and process monitoring for:

Petrochemical and chemical plants

Natural gas processing plants

Biogas plants

Higher heating value determinations in online natural gas analyzes and in energy generation Measurement of emissions

BRIEF DESCRIPTION OF THE FIGURES

The invention is described in greater detail hereafter using preferred embodiments and with reference to the drawings.

DETAILED DESCRIPTION OF THE EXEMPLARY EMBODIMENTS

Figure 1:
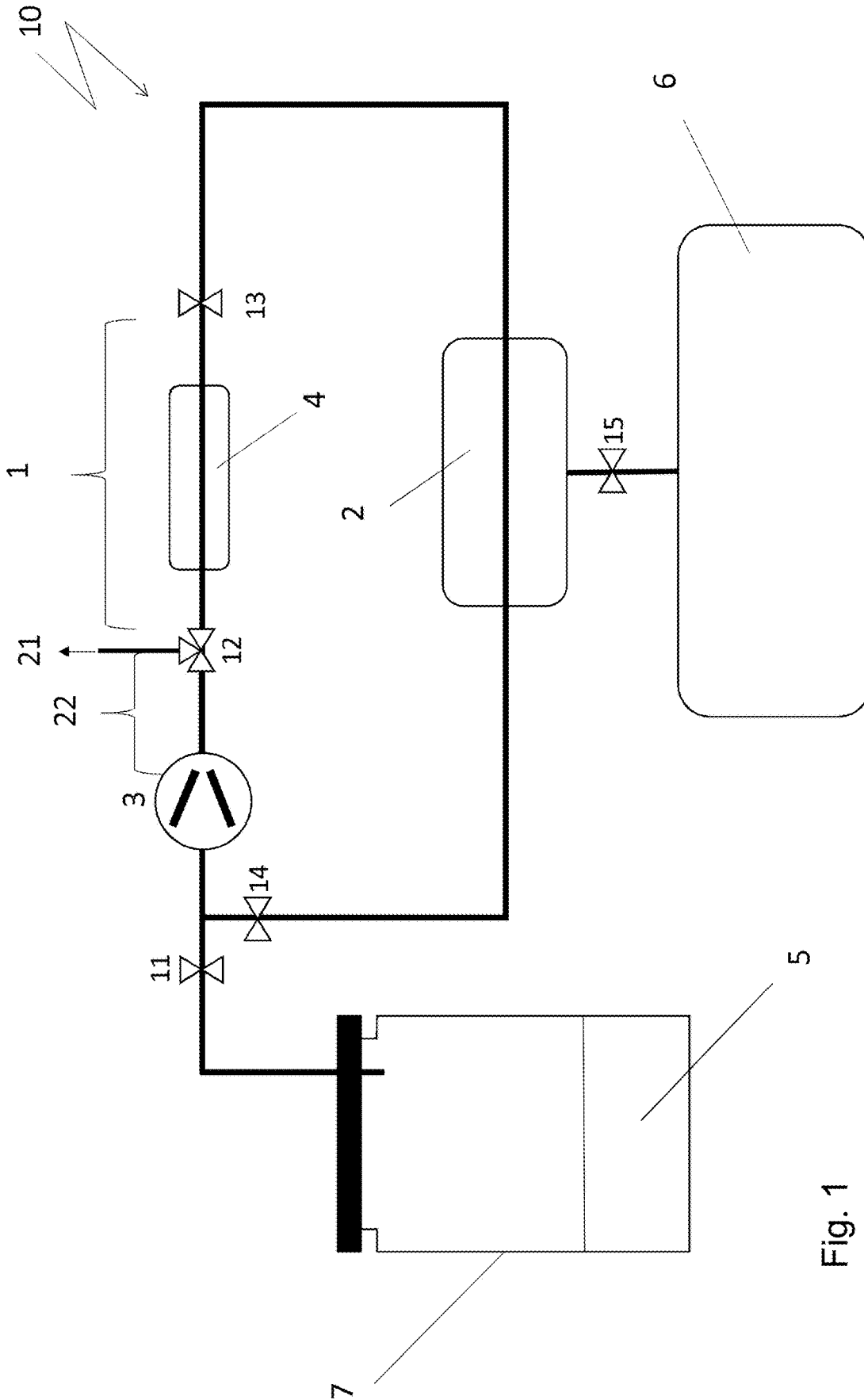
FIG. 1 schematically depicts an apparatus according to the invention, which is connected to a degassing vessel which is to be degassed.

FIG. 1 schematically depicts an apparatus 10 according to the invention, which is connected to a device (here a degassing volume or degassing vessel 7) which is to be degassed.

The apparatus comprises a 3-way valve 12, a first valve 15, a second valve 14, a third valve 11, an additional valve 13, a pump 3, a first volume which comprises a sensor vessel or first partial volume 1 and an expansion vessel or second partial volume 2, a gas tank or second volume 6 and a sensor 4 which is arranged in the first volume, more precisely in the first partial volume 1 (analysis volume). The first valve 15 is arranged between the first volume (more precisely the second partial volume 2) and the second volume 6. The pump 3 is arranged such that the pump 3, at the intake end, is connected to the first volume (more precisely second partial volume 2) via the second valve 14 and/or is connected to the degassing vessel 7 via the third valve 11. Via the 3-way valve 12, the pump 3 can be connected to either an air outlet 21 or to the first volume (more precisely first partial volume 1) at the discharge end. The additional valve 13 is arranged between the first partial volume 1 (analysis volume) and the second partial volume 2 (expansion volume).

The apparatus 10 is designed such that the dead volume 22 (volume inside the pipe from the discharge of the pump 3 to the intake of the 3-way valve 12) is as small as possible. The volume of the gas tank 6 is dictated in particular by the sum of the dead volume 22, analysis volume 1 and expansion volume 2, but as a rule is also limited by the maximally practically possible structural shape. In principle, the following applies: the larger the volume content of the gas tank 6, the better it is. For example, the degassing volume can have a volume content of approx. 300 ml (approx. 700 ml) (depending on the degassing vessel 7 used), the expansion volume 2 can have a volume content of approx. 10 ml, the analysis volume 1 can have volume content of approx. 500 µl and the gas tank 6 can have a volume content of approx. 750 ml (approx. 1.5 l).

The steps performed according to an inventive embodiment from the evacuation up to the analysis of the gases will be explained below using the apparatus 10 depicted in FIG. 1.

To begin, in a connecting step, the first volume 1, 2 is connected to the second volume 6 by opening the first valve 15. Alternatively, the result of this connecting step (i.e. the opened first valve 15) can be defined virtually as a prerequisite for the following evacuating step.

In the evacuating step, the apparatus 10 and the degassing vessel 7 are evacuated. The 3-way valve 12 is switched such that it connects the discharge of the pump 3 only to the air outlet 21. The first valve 15, the second valve 14, the third valve 11 and the additional valve 13 are opened. As a result, the pump 3 pumps the air or gases out of the first volume 1, 2, the second volume 6 and the degassing vessel 7 via the air outlet 21 out of the apparatus 10 and the degassing vessel 7. At the end of the evacuating step or evacuating phase, the degassing vessel 7, the first volume 1, 2 and the second volume 6 have a pressure of 0.1 mbar, for example, while the part of the apparatus 10 from the discharge of the pump 3 up to the intake of the 3-way valve 12 has an ambient pressure (approx. 1 bar). This part or this volume is the dead volume 22. After the switching from the evacuating step to the degassing step, the air located in this dead volume 22 contaminates, in particular, the analysis volume or first partial volume 1 in which the sensor 4 is arranged.

After the evacuating step, the degassing vessel 7 is cut off from the apparatus 10 by closing the third valve 11. A pressure equalisation then occurs, by the 3-way valve 12 being switched such that neither the discharge of the pump 3 nor the first volume (more precisely the first partial volume 1) have a connection to the air outlet 21. In particular, the 3-way valve 12 is switched such that the discharge of the pump 3 is connected only to the first volume (more precisely the first partial volume 1). The pressure set as a consequence of the pressure equalisation is determined by the ratio of the volume sizes of the first volume 1, 2 and of the second volume 6 to the dead volume 22. Due to the large volume size of the second volume or gas tank 6, the pressure in the first volume 1, 2 and in particular in the first partial volume 1, in which the gas will be analyzed, increases considerably less strongly than if the gas tank 6 were not present. As a result, the contamination by the dead volume 22 is also considerably less. In the case of a volume size of the analysis volume 1 of 500 µl, a volume size of the expansion volume 2 of 10 ml and a volume size of the gas tank 6 of 750 ml, a pressure of 0.6 mbar, for example, can be set in the first volume 1, 2 and the second volume 6. The pressure in the closed degassing vessel 7 remains at 0.1 mbar.

After the pressure has distributed uniformly within the volumes 1, 2, 6 of the apparatus 10, the second volume or gas tank 6 is cut off, by closing the first valve 6.

Furthermore, the degassing vessel 7 is advantageously filled with the liquid to be degassed (e.g. oil 5).

The cutting-off of the gas tank 6 and the filling of the degassing vessel 7 can be performed in any desired order. It is also possible for both steps to be performed at the same time.

After the second volume or gas tank 6 has been cut off and the degassing vessel 7 has been filled, the gas of liquid 5 which is to be degassed is degassed or pumped into the apparatus 10 in a degassing step. For this purpose, the third valve 11 is opened and the second valve 14 is closed. The 3-way valve 12 furthermore connects the discharge of the pump 3 only to the first volume (more precisely first partial volume 1), and the additional valve 13 is opened and furthermore connects the first partial volume 1 to the expansion volume or second partial volume 2, while the first valve 15 is furthermore closed. Then the pump 3, which pumps the gas from the degassing vessel 7 into the first volume 1, 2, is activated.

A compressing step can optionally take place between the degassing step and the following measuring step, in order to compress the gases in the first partial volume or analysis volume 1. For this compressing step, the first valve 15 remains closed, and the 3-way valve 12 furthermore connects the discharge of the pump 3 only to the first partial volume 1. The third valve 11 and the additional valve 13 are closed while the second valve 14 is opened. The pump 3 then pumps the gases out of the second partial volume or expansion volume 2 into the first partial volume 1, as a result of which the gases in the first partial volume or analysis volume 1 are compressed, which improves an analysis of the gases by means of the sensor 4 in the analysis volume 1. The more compressed the gases in the analysis volume 1 are, the higher the concentration of certain particles, to be analyzed, in the gases is, which advantageously increases an analysing ability of the sensor 4.

It should be noted that the present invention makes it possible for the evacuating step, the degassing step and the compressing step to be performed using one and the same pump 3. In particular, no additional pump is required in order to pump air away out of the dead volume 22 at the discharge of the pump 3.

After the degassing step or optionally after the compressing step, a measuring step takes place in which the gases in the first partial volume or analysis volume 1 are analyzed with the aid of the sensor 4.

Figure 2:
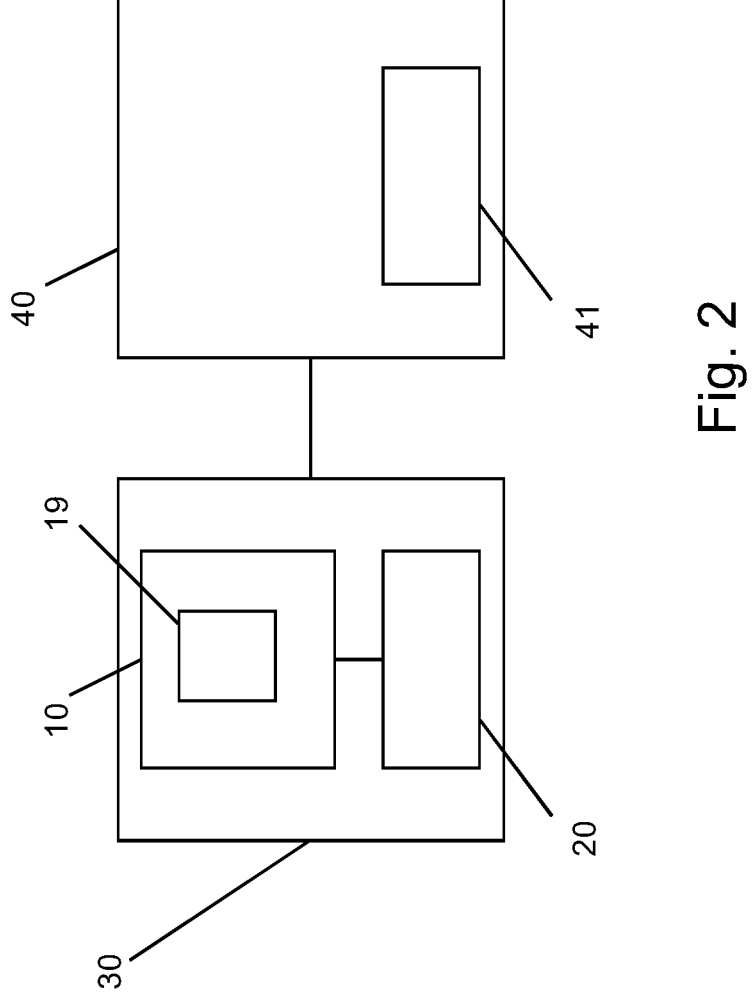
FIG. 2 schematically depicts a test system which is connected to a high-voltage installation which is to be tested.

The degassing process or degassing step and the activation of the valves 11-15 and of the pump 3 is preferably performed automatically or in a computer-aided manner by means of a suitable control unit (cf. the control unit 19 shown in FIG. 2).

A test system 30 according to the invention and a high-voltage installation 40 are schematically depicted in FIG. 2. The test system 30 is designed in order to examine an insulation 41 of the high-voltage installation 40. The test system 30 comprises an apparatus 10, according to the invention, for degassing, as described previously and schematically depicted in FIG. 1. Furthermore, the test system 30 comprises an evaluation unit 20, in order to draw up a result of the examination depending on the evacuation, degassing, optional compressing and subsequent analysis of the gas performed by the apparatus 10 with its control unit 19. The apparatus 10 analyzes a gas coming from the insulation 41, with the quality of the insulation 41, and thus a measurement of the operational readiness of the high-voltage installation 40 itself, being able to be determined by means of the analysis of this gas.

The invention claimed is:

1. An apparatus comprising a degassing vessel which is configured to be filled with a liquid to be degassed, the apparatus further comprising:

a pump, which is configured to pump gas and which, at a discharge end, is connected to an air outlet via a valve device and to a first volume via the valve device, wherein the first volume and a second volume are connected via a first valve, wherein, at an intake end, the pump is connected to the first volume via a second valve and is configured to be connected to the degassing vessel to be degassed, and a control unit for activating the pump, the valve device, the first valve and the second valve, wherein the control unit is configured to switch the valve device such that the valve device connects the pump only to the air outlet at the discharge end, to open the first valve and the second valve, and to then evacuate the degassing vessel, the first volume and the second volume by means of the pump.

2. The apparatus according to claim 1, wherein the second volume is at least ten times larger than the first volume.

3. The apparatus according to claim 1, wherein the control unit is configured to switch the valve device such that the valve device connects the pump only to the first volume at the discharge end, and to open the first valve and the second valve such that a pressure equalization is then carried out in an overall volume, which is formed by the first volume and the second volume and also a dead volume.

4. The apparatus according to claim 1, wherein the control unit is configured to switch the valve device such that the valve device connects the pump only to the first volume at the discharge end and to close the first valve and the second valve and to then pump gas from the device into the first volume by means of the pump.

5. The apparatus according to claim 1, wherein the apparatus comprises a third valve, with which, at the intake end, the pump is connected to the degassing vessel to be degassed.

6. The apparatus according to claim 5, wherein the control unit is configured to switch the valve device such that the valve device connects the pump only to the air outlet at the discharge end, to open the first valve, the second valve and the third valve, and to then evacuate the degassing vessel, the first volume and the second volume by means of the pump.

7. The apparatus according to claim 5, wherein the control unit is configured to switch the valve device such that the valve device connects the pump only to the first volume at the discharge end, to open the first valve and the second valve and to close the third valve, such that a pressure equalization is then performed in an overall volume that is formed by the first volume and the second volume and also a dead volume.

8. The apparatus according to claim 5, wherein the control unit is configured to switch the valve device such that the valve device connects the pump only to the first volume at the discharge end, to close the first valve and the second valve, to open the third valve and to then pump gas from the device into the first volume by means of the pump.

9. The apparatus according to claim 1 wherein the apparatus comprises a sensor, which is arranged in the first volume, and the sensor is configured to analyze the gas in the first volume.

10. The apparatus according to claim 1, wherein the first volume comprises a first partial volume and a second partial volume that are connected via an additional valve of the apparatus, the control unit is configured to switch the valve device such that the valve device connects the pump only to the first volume at the discharge end, to close the first valve, a third valve and the additional valve, to open the second valve and to then pump gas from the second partial volume into the first partial volume by means of the pump.

11. The apparatus according to claim 1, wherein the apparatus is configured to degas an insulating fluid of a high-voltage installation.

12. A test system comprising:

an evaluation unit and an apparatus comprising a degassing vessel which is configured to be filled with a liquid to be degassed, wherein the apparatus further comprises:

a pump, which is configured to pump gas and which, at a discharge end, is connected to an air outlet via a valve device and to a first volume via the valve device, wherein the first volume and a second volume are connected via a first valve, wherein, at an intake end, the pump is connected to the first volume via a second valve and is configured to be connected to the degassing vessel to be degassed, and a control unit for activating the pump, the valve device, the first valve and the second valve, wherein the control unit is configured to switch the valve device such that the valve device connects the pump only to the air outlet at the discharge end, to open the first valve and the second valve and to then evacuate the degassing vessel, the first volume and the second volume by means of the pump, and wherein the evaluation unit and the apparatus are configured to carry out an analysis of the gas in or from the degassing vessel.

13. The test system according to claim 12, wherein the control unit is configured to switch the valve device such that the valve device connects the pump only to the first volume at the discharge end, and to open the first valve and the second valve such that a pressure equalization is then carried out in an overall volume, which is formed by the first volume and the second volume and also a dead volume.

14. The test system according to claim 12, wherein the control unit is configured to switch the valve device such that the valve device connects the pump only to the first volume at the discharge end and to close the first valve and the second valve and to then pump gas from the device into the first volume by means of the pump.

15. The test system according to claim 12, wherein the first volume comprises a first partial volume and a second partial volume that are connected via an additional valve of the apparatus, the control unit is configured to switch the valve device such that the valve device connects the pump only to the first volume at the discharge end, to close the first valve, a third valve and the additional valve, to open the second valve and to then pump gas from the second partial volume into the first partial volume by means of the pump.

16. A method of operating the apparatus of claim 1, the method comprising:

connecting the first volume to the second volume which is supplied separately from the first volume, evacuating the degassing vessel, the first volume and the second volume, cutting the degassing vessel off from the first volume and the second volume, performing a pressure equalization in an overall volume which is formed by the first volume and the second volume and also a dead volume, cutting the second volume off from the first volume, filling the degassing vessel with a liquid to be degassed, and degassing the degassing vessel into the first volume.

17. The method according to claim 16, wherein the first volume comprises a first partial volume and a second partial volume, and after the degassing of the degassing vessel, the method comprises:

cutting the second partial volume off from the first partial volume, and pumping a gassing out of the second partial volume into the first partial volume.

* * * * *